United States Patent
Michishita

(10) Patent No.: US 6,496,302 B1
(45) Date of Patent: Dec. 17, 2002

(54) OPTICAL AMPLIFIER

(75) Inventor: Yukio Michishita, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/390,466

(22) Filed: Sep. 3, 1999

(30) Foreign Application Priority Data

Sep. 7, 1998 (JP) .......................................... 10-252660

(51) Int. Cl.⁷ .............................................. H04B 10/12
(52) U.S. Cl. ................................ 359/337.1; 359/341.41
(58) Field of Search ................................ 359/337, 341, 359/245; 372/38.06

(56) References Cited

U.S. PATENT DOCUMENTS

| | | | | |
|---|---|---|---|---|
| 5,436,760 A | * | 7/1995 | Nakabayashi | 359/341 |
| 5,664,131 A | * | 9/1997 | Sugaya | 359/341 |
| 5,745,283 A | * | 4/1998 | Inagaki et al. | 359/341 |
| 5,764,404 A | * | 6/1998 | Yamane et al. | 359/341 |
| 5,870,217 A | * | 2/1999 | Itou et al. | 359/179 |
| 5,900,969 A | * | 5/1999 | Srivastava et al. | 359/341 |
| 5,909,305 A | * | 6/1999 | Kinoshita | 359/341 |
| 5,912,760 A | * | 6/1999 | Sugaya | 359/341 |
| 5,923,462 A | * | 7/1999 | van der Plaats | 359/341 |
| 5,995,274 A | * | 11/1999 | Sugaya | 359/337 |
| 6,016,218 A | * | 1/2000 | Jo et al. | 359/341 |
| 6,025,947 A | * | 2/2000 | Sugaya et al. | 359/160 |
| 6,038,061 A | * | 3/2000 | Sugaya | 359/337 |
| 6,043,922 A | * | 3/2000 | Koga et al. | 359/193 |
| 6,055,092 A | * | 4/2000 | Sugaya | 359/337 |
| 6,061,171 A | * | 5/2000 | Taylor et al. | 359/341 |
| 6,091,539 A | * | 7/2000 | Kosaka | 359/341 |
| 6,151,157 A | * | 11/2000 | Ball et al. | 359/341 |
| 6,172,803 B1 | * | 1/2001 | Masuda et al. | 359/341 |
| 6,219,176 B1 | * | 4/2001 | Terahara | 359/341 |

FOREIGN PATENT DOCUMENTS

| | | | |
|---|---|---|---|
| JP | 8-223136 | 8/1996 | ............ H04J/14/00 |
| JP | 9-43647 | 2/1997 | ............ G02F/1/35 |

* cited by examiner

Primary Examiner—Thomas H. Tarcza
Assistant Examiner—Deandra M. Hughes
(74) Attorney, Agent, or Firm—Dickstein, Shapiro, Morin & Oshinsky, LLP.

(57) ABSTRACT

A compensation scheme for an optical amplifier that reduces differences in gain observed at various wavelengths combines and controls characteristics of an automatic gain control circuit and variable gain equalizers. The peak gain wavelength typically observed in optical amplifiers is reduced by shifting the variable gain equalizer characteristic, which has a wavelength region of maximum gain loss. By combining the characteristics of the peak wavelength gain with the maximum wavelength loss according to the various elements, a smooth gain curve can be realized. A variable gain equalizer control circuit provides the required control, and can control multiple variable gain equalizers positioned in various numbers and locations with regard to an optical amplifier section.

12 Claims, 8 Drawing Sheets

OPTICAL AMPLIFIER

This application is based on and claims benefit of Japanese Application Ser. No. 10-252660, file Sep. 7, 1998, to which a claim of priority is made under 35 U.S.C. §119.

BACKGROUND OF THE INVENTION

The present invention relates to an optical amplifier, especially to an optical amplifier that is used as a multistage relay of a wavelength division multiplexing transmission system.

Wavelength division multiplexing transmission (WDM transmission) in practical use provides high capacity communication. In a typical WDM transmission system, gain difference in each wavelength constituting a transmission wave becomes a major issue in a multistage optical amplifier relay. Accordingly, a low gain tilt is required to achieve high capacity communication in a WDM transmission system.

In a conventional gain equalization method, the transmission system is optimized by adjusting each optical amplifier to achieve overall performance. Alternatively, a fixed gain equalizer is used with each optical amplifier being used as an optical relay, as shown in FIG. 8.

In the optical relay of FIG. 8, a wavelength synthesizing coupler 1 synthesizes excited light generated by an excited light source 6 and an input optical signal. A rare-earth element doped fiber 2 that has received the synthesized light optically amplifies an input signal by means of excited light in the synthesized light. An isolator 3 prevents oscillation associated with the optical amplification. An optical branch 4 receives an output from the isolator 3 and generates an output that is converted into a current by a light receiving element 9. An automatic gain control circuit 8 controls an output level of the excited light source 6. Another output from the optical branch 4 is typically kept constant, based on the current generated by the light receiving element 9. Outputs from the optical branch 4 are input to fixed gain equalizer 18, and a gain difference of each wavelength is equalized and output.

Also, a method of obtaining optimum gain equalization in a transmission system is disclosed in JP-A-223136/1996, entitled "Gain Equalization Method In Optical Amplification Relay Technique" by Mr. Fukutoku, et al. A method of improving a gain difference by wavelengths of an optical amplifier is disclosed in JP-A-43647/1997, entitled "Gain Equalizer and Optical Amplifier" by Mr. Domon.

With regard to the above-mentioned gain equalization method, the optimum design for every transmission system varies in practice. The difference between the design and the practical implementation raises serious issues because the method is not general. The fixed gain equalizer method described above has a drawback in that a gain difference in each wavelength is dependent on variations in the gain of the optical amplifier due to temperature or change in input level of an input signal during wavelength division multiplexing transmission. Furthermore, the method in JP-A-223136/1996 does not lend itself to application to individual relays. In addition, the method in JP-A-43647/1997 realizes gain equalization by mechanically bending a fiber thereby being dependent on changes in temperature characteristics and provoking reliability concerns.

SUMMARY OF THE INVENTION

The objective of the present invention is to eliminate a gain difference in each wavelength based on variable operating environments including temperature and input level changes, and to provide an optical amplifier that can be used with each. relay.

An optical amplifier according to an embodiment of the present invention comprises:

an excited light source for generating excited light;

a wavelength synthesizing coupler for synthesizing an input optical signal and excited light generated by the above-described excited light source and outputting the resulting signal;

a rare-earth doped fiber for receiving an output from the above-described wavelength synthesizing coupler, and amplifying an input optical signal in the above-described output, which is excited by excited light in the above-described output;

an isolator connected to the above-described rare-earth doped fiber, for preventing oscillation associated with optical amplification of above-described fiber;

an optical branch for receiving the above-described amplified input optical signal which is output from the above-described isolator, and dividing it into outputs;

a first light receiving element for receiving a first output light from the above-described optical branch, and converting it into a current;

a an automatic gain control circuit for controlling an output level of said excited light source so as to make a level of a second output light from the above-described optical branch constant, based on current information output from the first light receiving element;

a second light receiving element for receiving excited light output from the above-described excited light source, and converting it into a current;

one or more than one variable gain equalizers for equalizing a gain difference of each wavelength of input light, and outputting it; and one or more than one variable gain equalization control means for controlling the above-described variable gain equalizers based on current information output from the second light receiving element so that a gain difference in each wavelength of light which is output from the above-described variable gain equalizers becomes constant.

The above-described variable gain equalization control means may have:

a current/voltage conversion circuit for receiving a current generated by the above-described second light receiving element, and converting it into a voltage;

a voltage control frequency generator for generating an alternating current having a frequency proportional to a level of a voltage generated by the above-described current/voltage conversion circuit;

an amplifier for amplifying an amplitude of the alternating current generated by the above-described voltage control frequency generator;

a control circuit for controlling the above-described amplifier so that an amplitude of the alternating current output by the above-described amplifier becomes to be a required value; and a drive circuit for receiving an alternating current output by the above-described amplifier, and driving the above-described variable gain equalizers.

The above-described variable gain equalizers may be inserted after the above-described optical branch.

The above-described variable gain equalizers may be inserted before the above-described wavelength synthesizing coupler.

The above-described variable gain equalizers may include one or more inserted after above-described optical branch and one or more before the above-described wavelength synthesizing coupler.

The above-described variable gain equalizers may be controlled by one of the variable gain equalization control means.

BRIEF DESCRIPTION OF THE DRAWINGS

The above and other objects, features and advantages of the present invention will become more apparent upon reviewing the following detailed description and drawings, in which.

DESCRIPTION OF THE EMBODIMENTS

Figure 1:
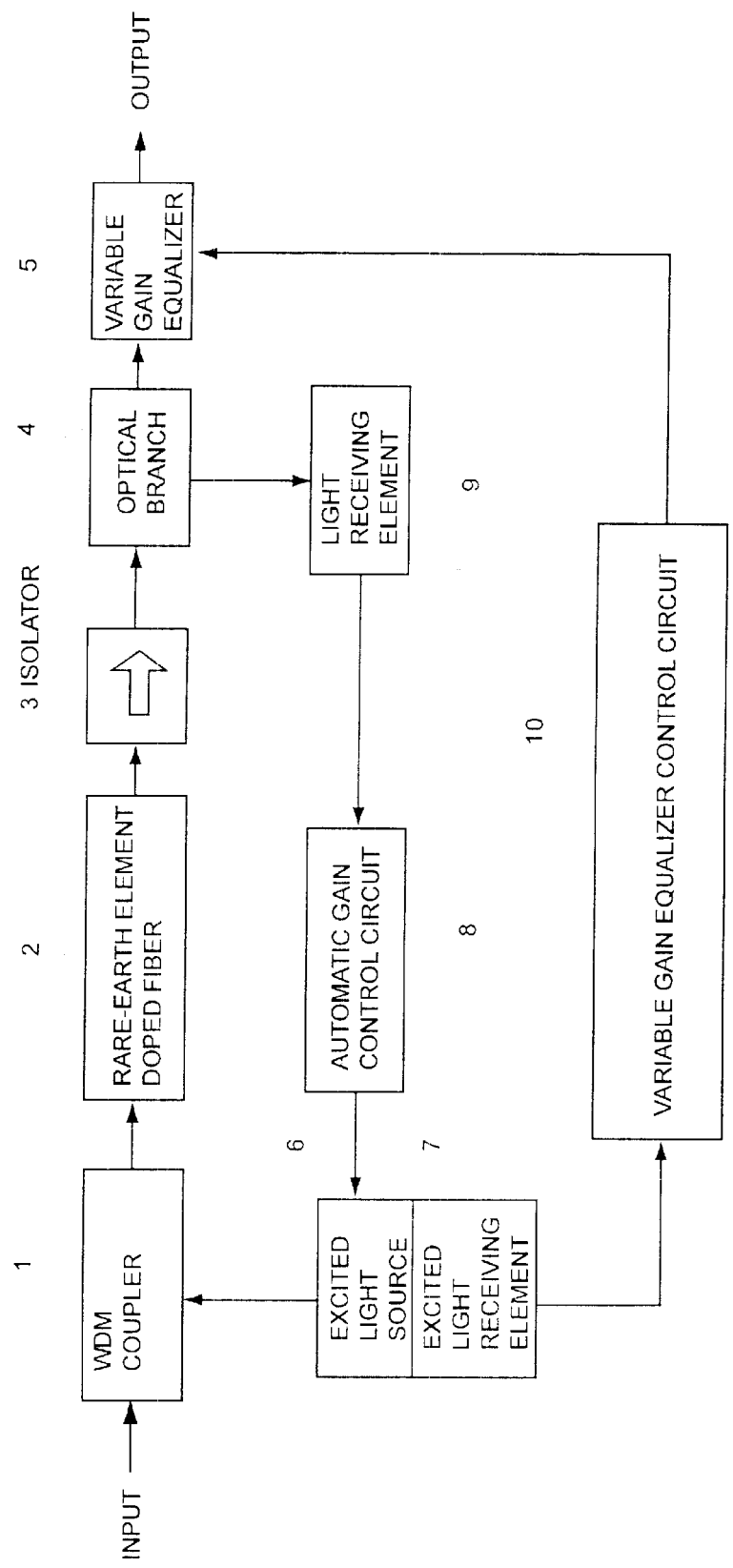
FIG. 1 is a schematic diagram of a first embodiment of an optical amplifier of the present invention.
Figure 8:
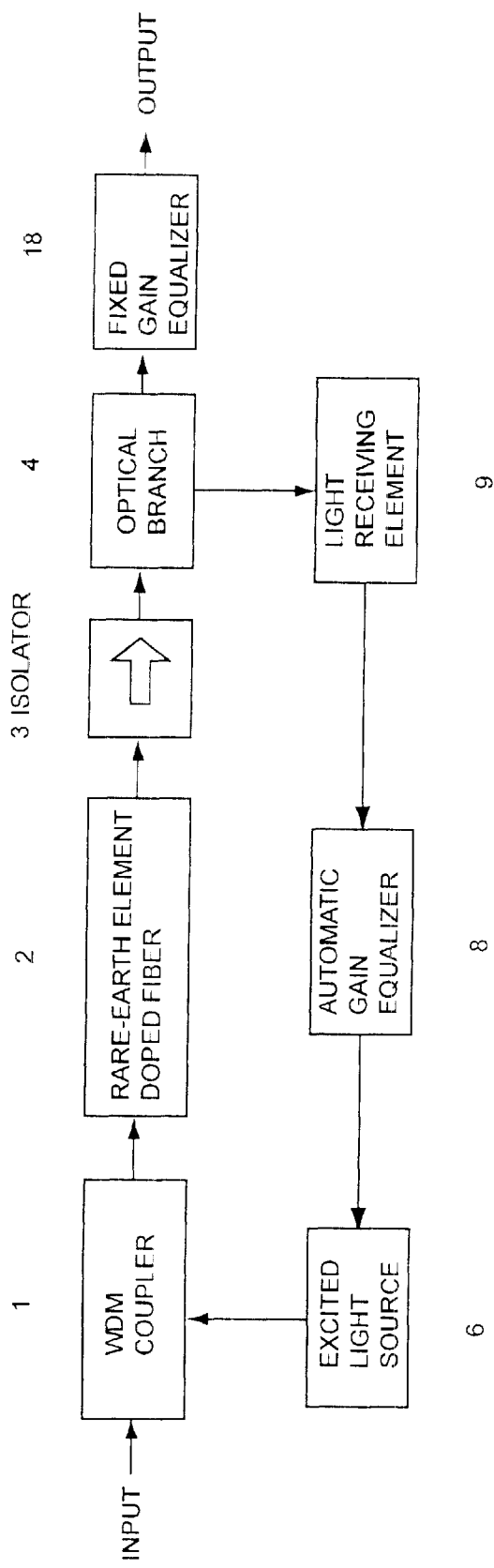

Referring now to FIG. 1, a first embodiment of an optical amplifier of the present invention is shown. In this optical amplifier, a variable gain equalizer 5 is used instead of the fixed gain equalizer 16 of the optical amplifier of FIG. 8. In addition, an excited light receiving element 7 and a variable gain equalizer control circuit 10 are added to the circuit shown in FIG. 8. The variable gain equalizer 5 in FIG. 1 is controlled by a control current having a radio frequency. An acoustic-wave optical element is used, in which a peak wavelength light loss is modified by a change in frequency of the control current, and light amplitude is changed by an amplitude of the control current (Publication: "Single-mode-fiber acousto-optic tunable notch filter with variable spectral profile" Hyo Sang Kim, et al.: 1997, Proceedings of Conference on Optical Fiber Communication). The excited light receiving element 7 converts excited light generated by the excited light source 6 into an electrical current. The variable gain equalizer control circuit 10 receives the current generated by the excited light receiving element 7, and based on the electrical current, generates a radio frequency control current. The radio frequency control current controls the variable gain equalizer 5 through frequency and amplitude modulations. The variable gain equalizer thus controlled reduces a gain difference between the respective wavelengths of light amplified by a rare-earth element doped fiber 2.

Figure 2:
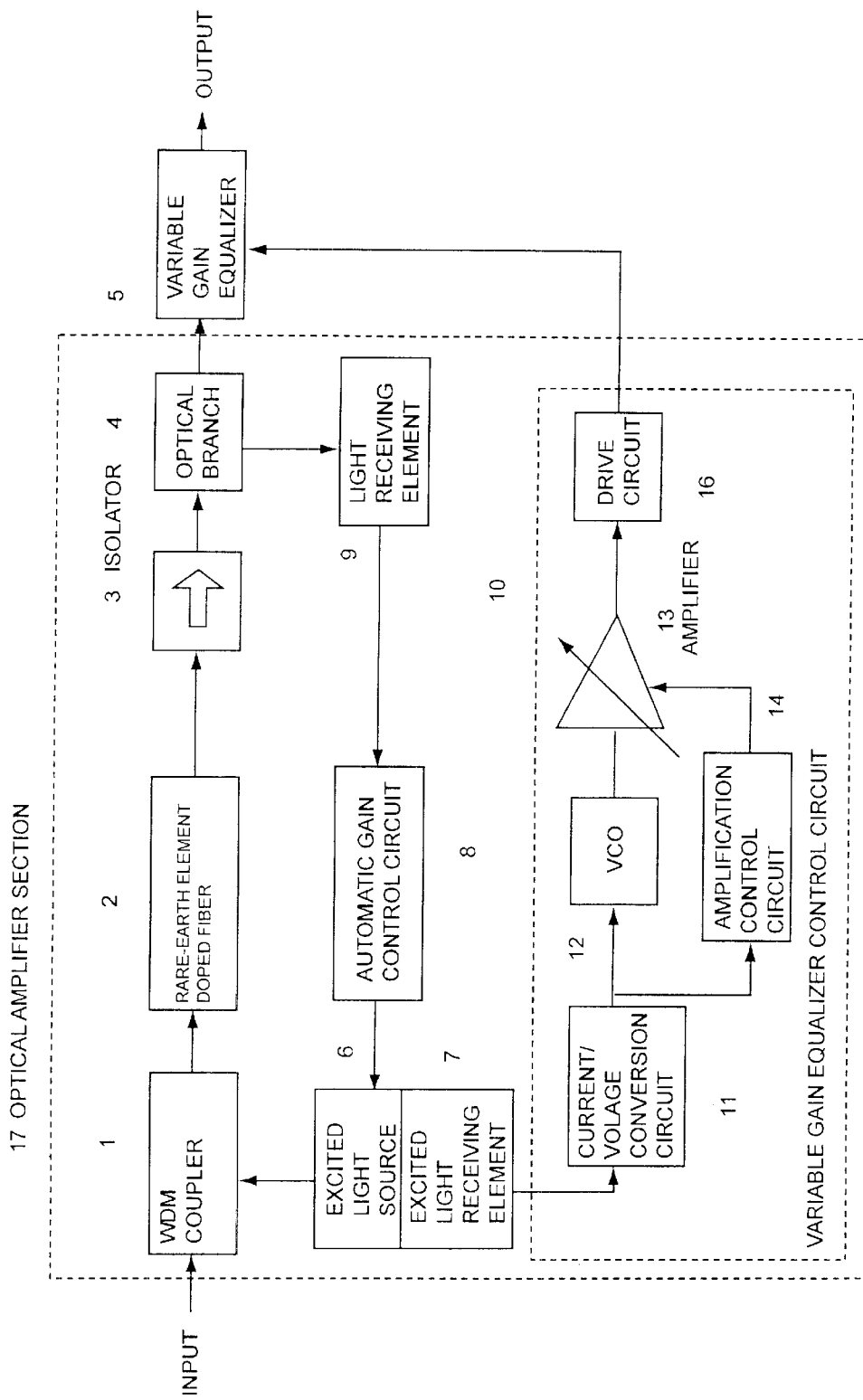
FIG. 2 is a schematic representation of one embodiment of the variable gain equalizer control circuit 10 of FIG. 1.

Referring now to FIG. 2, an embodiment of the variable gain equalizer control circuit 10 of FIG. 1 is shown. According to this embodiment, the variable gain equalizer control circuit 10 includes a current/voltage conversion circuit 11, a Voltage Controlled Oscillator (referred to as VCO, hereinafter) 12, an amplifier 13, an amplification control circuit 14, and a drive circuit 16.

The current/voltage conversion circuit 11 converts a value of a current generated by the excited light receiving element 7 into a voltage for output. The VCO 12 generates an alternating current having a radio frequency proportional to a voltage level generated by the current/voltage conversion circuit 11. The amplifier 13 amplifies the alternating current generated by the VCO 12. The amplification control circuit 14 controls a quantity of amplification of the amplifier 13 so as to comply with an input range of the drive circuit 16. The drive circuit 16 drives the variable gain equalizer 5 using a radio frequency current output by the amplifier 13 as a control current.

Figure 3:
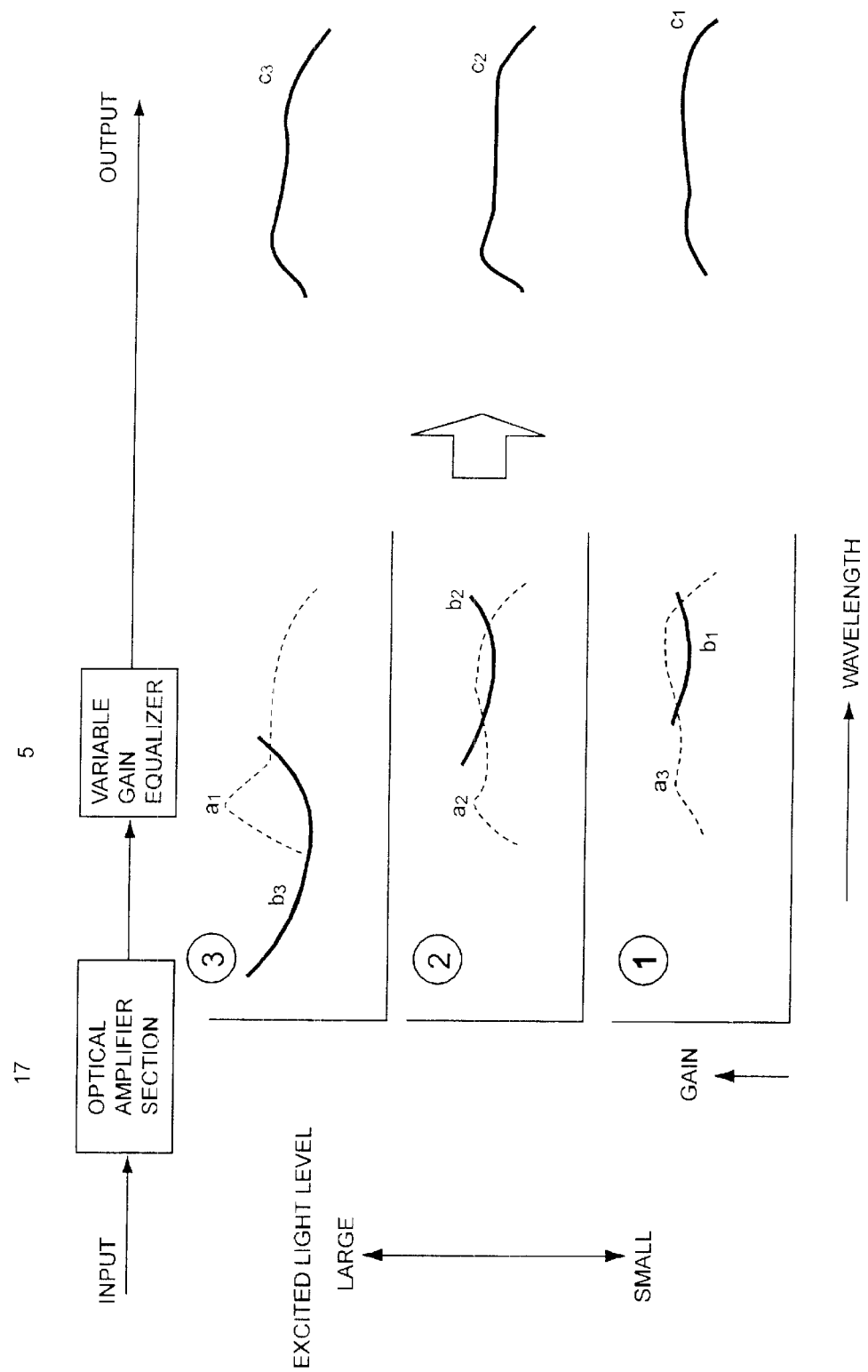
FIG. 3 is a representation explaining operation of the optical amplifier of FIG. 2.

Referring now to FIGS. 2 and 3, an explanation of the operation of the optical amplifier is provided. An optical input signal that is input into the optical amplifier is optically amplified by the rare-earth element doped fiber 2 that is being excited by the excited light source 6. An optical output representing the amplified signal is divided at the optical branch 4. The optical output is fed back to the light receiving element 9 to permit control for a constant level output. An output level of the excited light source 6 is controlled by the automatic gain control circuit 8 which receives a current signal from the light receiving element 9. Here, an isolator 3 prevents promulgation of oscillation induced by the rare-earth element doped fiber 2. If the variable gain equalizer 5 is not included in the circuit, as indicated by an optical amplifier section 17, the gain characteristic has a dependence related to wavelength. The gain dependence on wavelength is shown by broken lines $a_1$, $a_2$, and $a_3$ of FIG. 3 ① to ③ for levels (Pumping power) of excited light source 6. For reduced levels of excited light, the optical amplifier characteristics are reflected by the broken line ①. As the level of the excited light is enhanced, a peak gain-wavelength tends to occur in a shorter wavelength region as shown in ② & ③. For example, when an input level of the optical amplifier is reduced, the automatic gain control circuit 8 acts to keep the output level of the light constant. Accordingly, an excited light level produced by the excited light source 6 increases to maintain constant output levels. As light levels input to the excited light receiving element 7 increase, output current similarly increases to a large value. Since a larger current results, a large voltage is generated by the current/voltage conversion circuit 11, and it is sensed that the excited light level has increased to a large level.

The characteristics of the variable gain equalizer 5 produces peak light loss wavelength that changes in accordance with the control current frequency. The quantity of light loss also changes in accordance with an amplitude of the control current, as shown by solid lines $b_1$, $b_2$ and $b_3$ in a graph, of FIG. 3. Thus, the loss in gain of the variable gain equalizer 5 is large when the excited light level becomes large. A desirable output gain characteristic can be achieved by defining a current frequency generated by the VCO 12 to move the peak gain loss toward a shorter wavelength side. In addition, the amplifier 13 can be controlled to amplify current amplitude by the amplification control circuit 14. By controlling and combining the characteristics of the variable gain equalizer 5 and the variable gain equalizer control circuit 10, the output signal characteristic can be obtained in which a gain difference between the respective wavelengths is like solid lines $c_1$, $c_2$ and $c_3$ shown on a right-hand side of FIG. 3.

Figure 4:
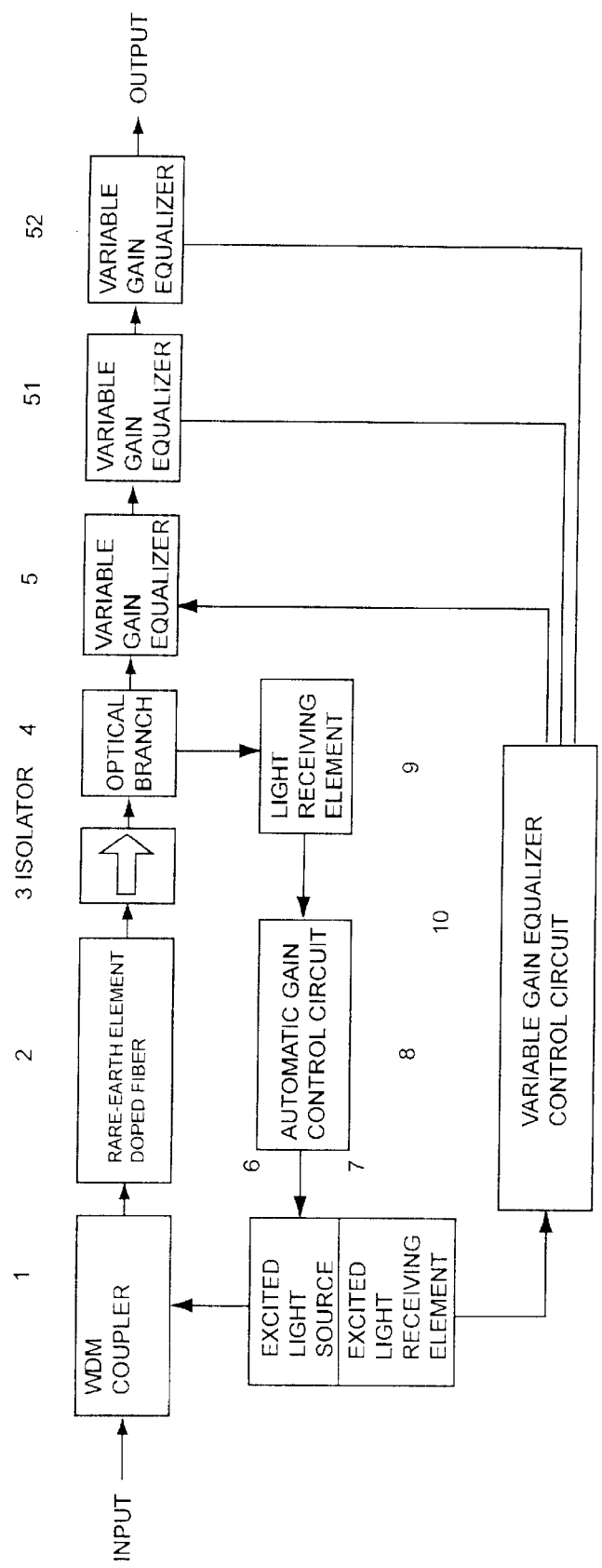
FIG. 4 is a schematic diagram of a second embodiment of the optical amplifier of the present invention.

Referring now to FIG. 4, a schematic diagram of a second embodiment of the optical amplifier of the present invention is shown. In this optical amplifier, variable gain equalizers 51 and 52 are inserted in series after the variable gain equalizer 5 of the optical amplifier of FIG. 1. The variable gain equalizers 51 and 52 are also controlled by the variable gain equalizer control circuit 10. The addition of the variable gain equalizers 51 and 52 further reduces a gain difference observed between the various wavelengths of an input and amplified light.

In the optical amplifier of the second embodiment, although the three-stage variable gain equalizers are inserted in series, generally n variable gain equalizers can be used in series.

Figure 5:
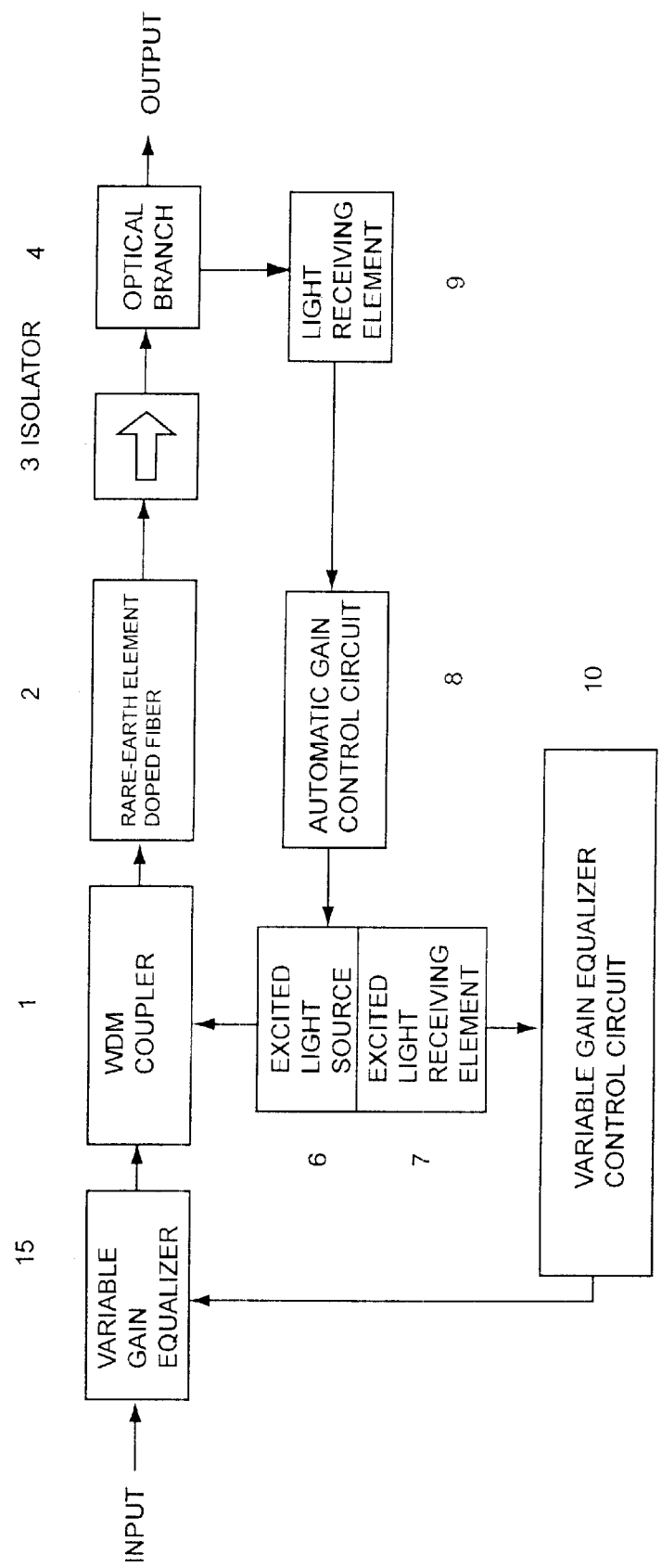
FIG. 5 is a schematic diagram of a third embodiment of the optical amplifier of the present invention.

Referring now to FIG. 5, a schematic diagram of a third embodiment of the optical amplifier of the present invention is shown. This optical amplifier has an arrangement similar to that of the optical amplifier shown in FIG. 1. A variable gain equalizer 15 is inserted before the wavelength synthesizing coupler 1 instead of being located in the position of the variable gain equalizer 5 of FIG. 1. The variable gain equalizer 15 is controlled by the variable gain equalizer control circuit 10 and functions to reduce gain differences between the respective wavelengths of input light. The optical amplifier thus outputs amplified light in which the gain difference between the respective wavelengths is reduced.

Figure 6:
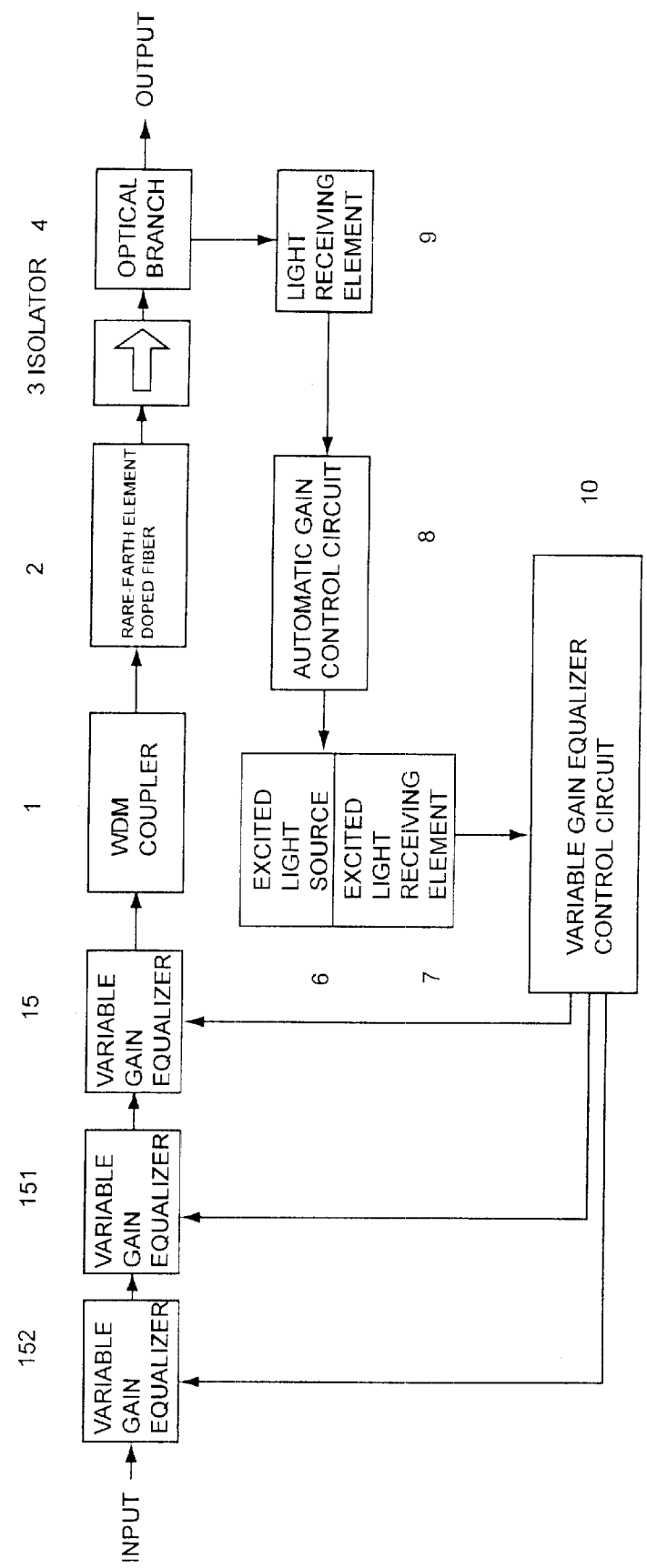
FIG. 6 is a schematic diagram of a fourth embodiment of the optical amplifier of the present invention.

Referring now to FIG. 6, a schematic diagram of a fourth embodiment of the optical amplifier of the present invention is shown. In this optical amplifier, variable gain equalizers 151 and 152 are inserted in series before the variable gain equalizer 15 of the optical amplifier of FIG. 5. The variable gain equalizers 151 and 152 are controlled by the variable gain equalizer control circuit 10 and function to further reduce a gain difference between the respective wavelengths of input light. Output light from the optical amplifier thus has the characteristic that the gain difference between the respective wavelengths is further reduced.

In the optical amplifier of the fourth embodiment, although the three-stage variable gain equalizers are inserted in series, generally n variable gain equalizers can be used in series.

Figure 7:
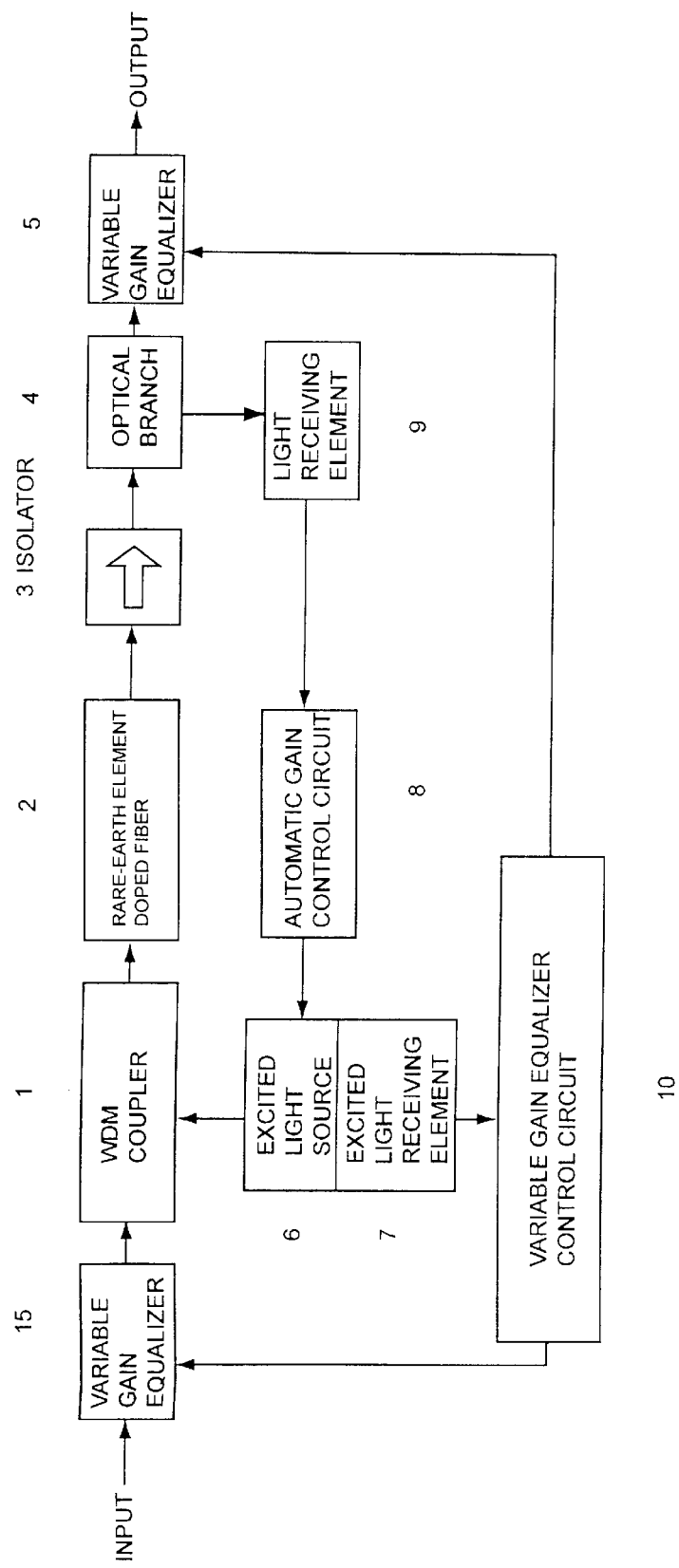
FIG. 7 is a schematic diagram of a fifth embodiment of the optical amplifier of the present invention and FIG. 8 is a schematic diagram of a conventional example of an optical amplifier.

Referring now to FIG. 7, a schematic diagram of a fifth embodiment of the optical amplifier of the present invention is shown. In this optical amplifier, the variable gain equalizer 15 similar to that shown in FIG. 5 is inserted before the wavelength synthesizing coupler 1 of FIG. 1. The variable gain equalizer 15, together with the variable gain equalizer 5, is controlled by the variable gain equalizer control circuit 10.

In this embodiment, the variable gain equalizers are used on an input side and an output side of the optical amplifier, and reduction of the gain difference between the respective wavelengths is effectively realized. In the optical amplifier of this embodiment, although one variable gain equalizer is used on each of the input side and the output side, it is possible to adopt an arrangement in which n variable gain equalizers are arranged, respectively, on the input side and the output side of the optical amplifier, as in the second and third embodiments.

As explained above, one or more variable gain equalizers and variable gain equalizer control means for controlling the variable gain equalizers may be used in the present invention. It is possible to obtain output light having characteristics that, even when a level of input light changes, a gain difference between respective wavelengths is reduced. The present invention thus realizes several advantages that are applicable to a multistage relay of a WDM transmission system.

The entire disclosure of Japanese Patent Application No. 10-252660 filed on Sep. 7, 1998 including specification, claims, drawing and summary are incorporated herein by reference in its entirety.

What is claimed is:

1. An optical amplifier comprising:
   an excited light source for generating an excited light which is used to produce an amplified light;
   a variable gain equalizer for equalizing a gain difference between respective wavelengths of said amplified light; and
   a variable gain equalizer control circuit for controlling said variable gain equalizer based on power of said excited light so as to reduce said gain difference between said respective wavelengths of said amplified light.

2. An optical amplifier comprising:
   an excited light source for generating an excited light which is used to produce an amplified light;
   an excited light receiving element for receiving said excited light, converting said excited light into a current and outputting said current;
   a variable gain equalizer for equalizing a gain difference between respective wavelengths of said amplified light; and
   a variable gain equalizer control circuit for controlling said variable gain equalizer based on said current output from said excited light receiving element so as to reduce said gain difference between said respective wavelengths of said amplified light.

3. An optical amplifier comprising:
   an excited light source for generating an excited light which is used to amplify an input light;
   a variable gain equalizer for equalizing a gain difference between respective wavelengths of said input light; and
   a variable gain equalizer control circuit for controlling said variable gain equalizer based on power of said excited light so as to reduce said gain difference between said respective wavelengths of said input light.

4. An optical amplifier comprising:
   an excited light source for generating an excited light which is used to amplify an input light;
   an excited light receiving element for receiving said excited light, converting said excited light into a current and outputting said current;
   a variable gain equalizer for equalizing a gain difference between respective wavelengths of said input light, and
   a variable gain equalizer control circuit for controlling said variable gain equalizer based on said current output from said excited light receiving element so as to reduce said gain difference between said respective wavelengths of said input light.

5. An optical amplifier comprising:
   an excited light source for generating an excited light;
   a wavelength synthesizing coupler for synthesizing an input light and said excited light, and outputting a synthesized light;
   a rare-earth doped fiber for receiving said synthesized light and amplifying said synthesized light to produce an amplified light;
   an isolator connected to said rare-earth doped fiber to prevent oscillation of said rare-earth doped fiber;
   an optical branch for receiving said amplified light and dividing said amplified light into at least a first output light and a second output light;
   a first light receiving element for receiving said first output light and converting said first output light into a first current;

an automatic gain control circuit for controlling an output level of said excited light source based on said first current from said first light receiving element so as to adjust said second output light from said optical branch;

a second light receiving element for receiving said excited light from said excited light source and converting said excited light into a second current;

at least one variable gain equalizer for equalizing a gain difference between respective wavelengths of said second output light; and at least one variable gain equalizer control circuit for controlling said at least one variable gain equalizer based on said second current from said second light receiving element so as to reduce said gain difference between said respective wavelengths of said second output light.

6. An optical amplifier according to claim 5, wherein said at least one variable gain equalizer control circuit comprises:

a current/voltage conversion circuit for receiving said second current from said second light receiving element and converting said second current into a voltage;

a voltage control frequency generator for generating an alternating current having a frequency proportional to a level of said voltage generated by said current /voltage conversion circuit;

a current amplifier for amplifying an amplitude of said alternating current generated by said voltage control frequency generator;

a current amplifier current control circuit for controlling said current amplifier so that said amplitude of said alternating current output from said current amplifier attains a specified value; and a drive circuit for receiving said alternating current output from said current amplifier, and driving said at least one variable gain equalizer.

7. An optical amplifier comprising:

an excited light source for generating an excited light;

a wavelength synthesizing coupler for synthesizing an input light and said excited light and outputting a synthesized light;

a rare-earth doped fiber for receiving said synthesized light and amplifying said synthesized light to produce an amplified light;

an isolator connected to said rare-earth doped fiber to prevent oscillation of said rare-earth doped fiber;

an optical branch for receiving said amplified light and dividing said amplified light into at least a first output light and a second output light;

a first light receiving element for receiving said first output light and converting said first output light into a first current;

an automatic gain control circuit for controlling an output level of said excited light source based on said first current from said first light receiving element so as to adjust said second output light from said optical branch;

a second light receiving element for receiving said excited light from said excited light source and converting said excited light into a second current;

at least one variable gain equalizer for equalizing a gain difference between respective wavelengths of said input light; and at least one variable gain equalizer control circuit for controlling said at least one variable gain equalizer based on said second current from said second light receiving element so as to reduce said gain difference between said respective wavelengths of said input light.

8. An optical amplifier according to claim 7, wherein said at least one variable gain equalizer control circuit comprises:

a current/voltage conversion circuit for receiving said second current from said second light receiving element and converting said second current into a voltage;

a voltage control frequency generator for generating an alternating current having a frequency proportional to a level of said voltage generated by said current/voltage conversion circuit;

a current amplifier for amplifying an amplitude of said alternating current generated by said voltage control frequency generator;

a current amplifier current control circuit for controlling said current amplifier so that said amplitude of said alternating current output from said current amplifier attains a specified value; and a drive circuit for receiving said alternating current output from said current amplifier, and driving said at least one variable gain equalizer.

9. An optical amplifier according to claim 2, wherein said variable gain equalizer control circuit comprises:

a current/voltage conversion circuit for receiving said current from said excited light receiving element and converting said current into a voltage;

a voltage control frequency generator for generating an alternating current having a frequency proportional to a level of said voltage generated by said current /voltage conversion circuit;

a current amplifier for amplifying an amplitude of said alternating current generated by said voltage control frequency generator;

a current amplifier current control circuit for controlling said current amplifier so that said amplitude of said alternating current output from said current amplifier attains a specified value; and a drive circuit for receiving said alternating current output from said current amplifier, and driving said variable gain equalizer.

10. An optical amplifier according to claim 2, wherein said variable gain equalizer is a first variable gain equalizer, said optical amplifier further comprising a second variable gain equalizer, wherein said first and second variable gain equalizers are connected on an output and an input side of said optical amplifier, respectively.

11. An optical amplifier according to claim 2, wherein said variable gain equalizer is a first variable gain equalizer, said optical amplifier further comprising a second variable gain equalizer, wherein said first and second variable gain equalizers are connected on an output side of said optical amplifier.

12. An optical amplifier according to claim 2, wherein said variable gain equalizer is a first variable gain equalizer, said optical amplifier further comprising a second variable gain equalizer, wherein said first and second variable gain equalizers are connected on an input side of said optical amplifier.

* * * * *